United States Patent
Döring et al.

(10) Patent No.: US 11,130,695 B2
(45) Date of Patent: Sep. 28, 2021

(54) PROCESS FOR PURIFICATION OF WASTE WATER FROM DAIRY PROCESSING

(71) Applicant: DMK Deutsches Milchkontor GmbH, Zeven (DE)

(72) Inventors: Sven-Rainer Döring, Zeven (DE); Thorben Oehlckers, Buchholz (DE)

(73) Assignee: DMK DEUTSCHES MILCHKONTOR GMBH, A BODY CORPORATE, Zeven (DE)

(*) Notice: Subject to any disclaimer, the term of this patent is extended or adjusted under 35 U.S.C. 154(b) by 415 days.

(21) Appl. No.: 16/151,879

(22) Filed: Oct. 4, 2018

(65) Prior Publication Data

US 2019/0106344 A1 Apr. 11, 2019

(30) Foreign Application Priority Data

Oct. 5, 2017 (EP) .................................. 17194947

(51) Int. Cl.
*C02F 9/00* (2006.01)
*C02F 1/44* (2006.01)
(Continued)

(52) U.S. Cl.
CPC ............. *C02F 9/00* (2013.01); *C02F 1/441* (2013.01); *C02F 1/66* (2013.01); *C02F 1/22* (2013.01); *C02F 2101/30* (2013.01); *C02F 2101/32* (2013.01); *C02F 2101/38* (2013.01); *C02F 2103/327* (2013.01); *C02F 2209/08* (2013.01);
(Continued)

(58) Field of Classification Search
None
See application file for complete search history.

(56) References Cited

U.S. PATENT DOCUMENTS 2,071,368 A * 2/1937 Weisberg ............... C07C 59/08
562/513
6,506,305 B2 * 1/2003 Morita ................... A23C 9/1427
210/650

(Continued)

OTHER PUBLICATIONS

EP Search Report for European Application EP17194947.2 dated Nov. 12, 2017, pp. 1-4.

(Continued)

*Primary Examiner* — Chester T Barry
(74) *Attorney, Agent, or Firm* — Michael P. Byrne; Wolter, Van Dyke, Davis PLLC

(57) ABSTRACT

A process for purification of waste water from dairy processing, which may include providing waste water from the dairy-processing industry that includes lactic acid and urea; adjusting the waste water to an alkaline pH value, while precipitating the lactic acid as a lactate; subjecting the waste water to a first reverse osmosis step, obtaining a lactate-containing first retentate and a lactate-free first permeate; adjusting the first permeate such obtained to an acid pH value; cooling the permeate that has been adjusted to an acid pH to a temperature within the range of 2 to 10° C.; subjecting the cooled first permeate to a second reverse osmosis step, obtaining a urea-containing second retentate and a second permeate that is practically completely free from organic loading; and, optionally, recycling the second permeate, reintroducing it into a dairy-processing procedure.

15 Claims, 1 Drawing Sheet

(51) Int. Cl.
  *C02F 1/66* (2006.01)
  *C02F 101/38* (2006.01)
  *C02F 103/32* (2006.01)
  *C02F 101/30* (2006.01)
  *C02F 1/22* (2006.01)
  *C02F 101/32* (2006.01)
(52) U.S. Cl.
  CPC .... *C02F 2301/046* (2013.01); *C02F 2301/08* (2013.01)

(56) References Cited

U.S. PATENT DOCUMENTS

| | | | | |
|---|---|---|---|---|
| 8,349,597 | B2* | 1/2013 | Ito | B01D 61/027 435/139 |
| 2003/0044735 | A1* | 3/2003 | Martin | G03D 3/065 430/398 |
| 2005/0211239 | A1* | 9/2005 | Koivikko | B01D 15/362 127/55 |
| 2013/0052703 | A1* | 2/2013 | Oka | C12P 7/56 435/139 |
| 2013/0105389 | A1* | 5/2013 | Arai | C02F 9/00 210/610 |
| 2014/0061127 | A1* | 3/2014 | Cabrera | C02F 9/00 210/632 |
| 2017/0073250 | A1* | 3/2017 | MacCallum | C02F 1/447 |
| 2017/0275663 | A1* | 9/2017 | Minamino | C12Y 302/01025 |

OTHER PUBLICATIONS

Vourch, M., et al., Nanofiltration and reverse osmosis of model process waters from the dairy industry to produce water for reuse, "Desalination", vol. 172, pp. 245-256 (2005).

* cited by examiner

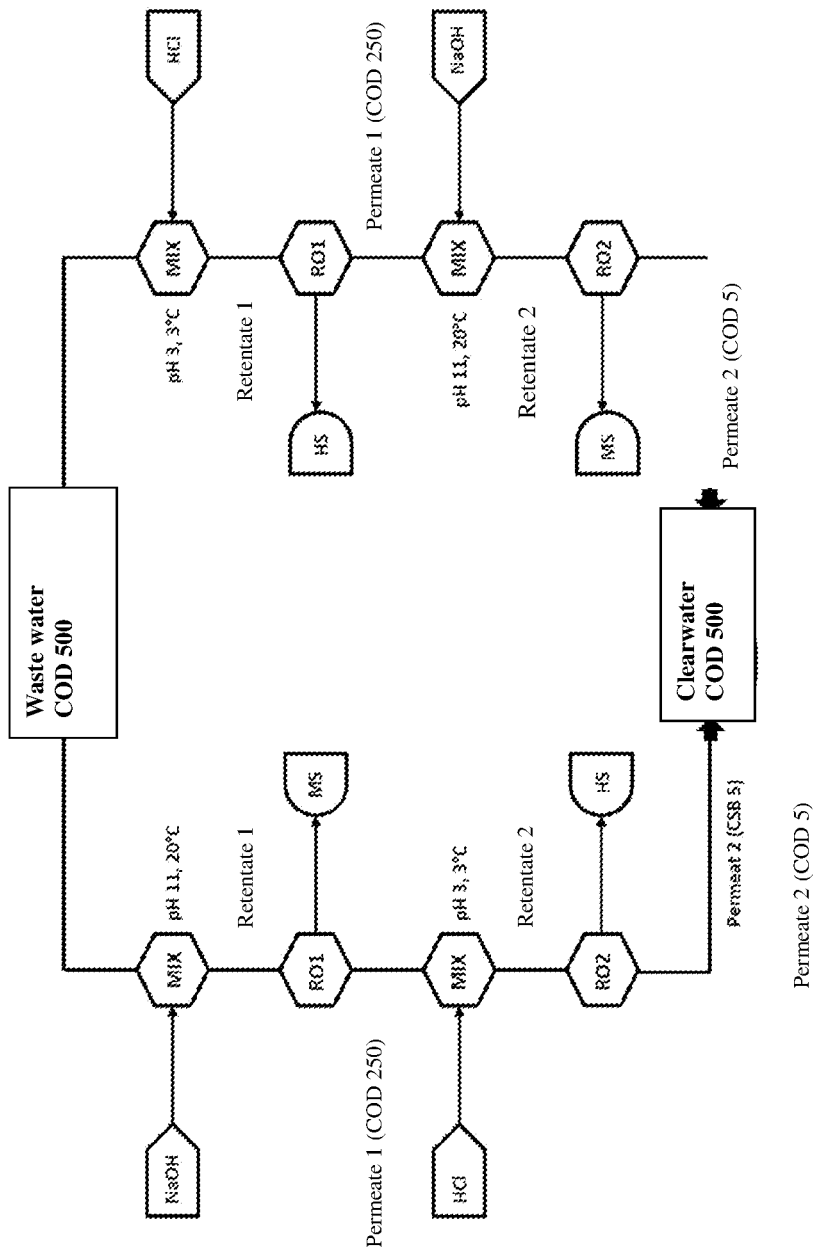

PROCESS FOR PURIFICATION OF WASTE WATER FROM DAIRY PROCESSING

CROSS REFERENCE TO RELATED APPLICATIONS

This application claims the benefit of European Patent Application No. EP 17 194 947.2, titled Process for Purification of Waste Water from Dairy Processing, filed on Oct. 5, 2017, which is incorporated by reference herein in its entirety.

FIELD OF INVENTION

The invention is in the field of dairy industry and relates to a process for purification of waste water which is polluted with organic load.

BACKGROUND OF INVENTION

Particularly in the dairy industry, industrial waste waters are generated by many technical processes, for example, evaporation and membrane processes, which have a COD (Chemical Oxygen Requirement) loading within the range of 500 to 1,500 COD, and must therefore be disposed of through treatment plants.

Technology distinguishes between mechanical (filtration) processes and microbiological processes. In order to provide an example of the comprehensive state of the art, it is referred to WO 2015 181270 A1 (WITT) and WO 2017 136296 A1 (STIOPKIN).

Waste water having lactic acid (typically: 0.03 to 0.1% by weight) and urea (typically: 0.5 to 2.0 mg/kg) is particularly problematic, such as, for example, vapour condensates from acid whey production, as membranes are not capable of quantitatively separating small molecules such as urea under normal process conditions, as would be required in order be able to reuse water treated in this manner.

Taking into account that the cost of water treatment amounts to more than 2 EUR/m$^3$ and that a few thousand tons of process water are generated in the dairy industry on a daily basis, which need to be treated, it becomes instantly clear that there is great economic pressure for an alternative solution.

The task of the present invention was therefore to treat waste waters loaded with lactic acid and urea and having a COD within the range of 500 and above, in a possibly simple manner, continuously reaching a COD of less than 50, and particularly less than 10, so that the waste waters are not disposed of or treated industrially, but may be recycled and be re-introduced into process steps within the dairy industry.

SUMMARY OF INVENTION

The present invention relates to a process for purification of waste water from dairy processing, comprising or consisting of the following steps:
(a) providing waste water from the dairy-processing industry, the organic load thereof substantially consisting of lactic acid and urea;
(b) adjusting the waste water to an alkaline pH value, while precipitating the lactic acid as a lactate;
(c) subjecting the waste water such treated to a first reverse osmosis step, obtaining a lactate-containing first retentate and a lactate-free first permeate;
(d) adjusting the first permeate such obtained to an acid pH value;
(e) cooling the permeate that has been adjusted to an acid pH to a temperature within the range of 2 to 10° C.;
(f) subjecting the cooled first permeate to a second reverse osmosis step, obtaining a urea-containing second retentate and a second permeate that is practically completely free from organic loading; and, optionally,
(g) recycling the second permeate, reintroducing it into a dairy-processing procedure.

BRIEF DESCRIPTION OF THE DRAWING

Many aspects of this disclosure can be better understood with reference to the following figures, in which:

FIG. 1: is an example according to various embodiments, illustrating a schematic diagram of the process.

It should be understood that the various embodiments are not limited to the examples illustrated in the figures.

DETAILED DESCRIPTION

Surprisingly, it was found that the procedure explained above completely solves this task. To this end, a waste water loaded accordingly is initially adjusted to an alkaline pH value using a lye, in the process of which lactate is precipitated. Said lactate is separated as retentate in a first reverse osmosis step, whereby the COD value is already decreased to about half of its original value. The permeate, which is still containing urea, is adjusted to an acid pH value by adding an inorganic acid, is cooled down to 2 to 10° C., and supplied to a second reverse osmosis membrane of the same pore size. These two measures—acid pH value and low temperature—have the effect that the pores of the membrane narrow to such an extent that also urea is quantitatively separated, obtaining a second permeate typically having a COD of below 5.

In this case, the order of the two steps of lactate separation and urea separation is reversible.

The critical feature is the pH shift, as the precipitation of lactate is only performed in an alkaline environment; in an acidic environment, the lactate would transform to soluble lactic acid, while the narrowing of the pores of the osmosis membrane requires an acidic environment.

Waste Water

The present invention specifically relates to waste water which is produced during the processing of milk and the production of dairy products. This is, in particular, waste water from concentration and membrane processes, specifically from the evaporation and spray drying steps of dairy fractions as well as filtration steps such as reverse osmosis, as these have lactic acid and urea as their organic main load, which are difficult to completely separate when together. Waste water of this type typically has a COD value of about 500 and above, wherein the joint portion of lactic acid and urea amounts to at least 90% by weight, and typically about 92 to 98% by weight of the total organic load.

The following process according to the invention explained below is divided into two steps, i.e., the separation of the lactic acid and the separation of the urea, wherein the two steps can be performed in any order.

Separation of the Lactic Acid (LA)

The waste water to be treated is initially adjusted to an alkaline pH value, preferably within the range of about 9 to about 11, and more preferably about 10, to separate the lactic acid. Inorganic bases are suitable to do this, particularly concentrated sodium hydroxide solution or potassium hydroxide solution, and, optionally, also calcium hydroxide.

As a result of this measure, the lactic acid is precipitated as sodium lactate, potassium lactate or calcium lactate.

The separation of the lactate is performed by means of reverse osmosis. Reverse osmosis ("RO") is a physical method for concentrating substances that are dissolved in liquids, wherein the pressure of the natural osmosis process is reversed.

The process principle is that the medium in which the concentration of a particular substance is to be reduced is separated by a semi-permeable membrane from the medium in which the concentration is to be increased. The latter is subjected to a pressure that must be higher than the pressure created by the osmotic requirement to establish a concentration equilibrium. In doing so, the molecules of the solvent may travel against their "natural" osmotic expansion direction. By this method they are pressed into the compartment where dissolved substances are present in a lower concentration. Typical pressures of reverse osmosis are within the range of 3 to 30 bar (desalination of drinking water) or up to 80 bar (desalination of sea water).

The osmotic membrane which only allows the carrier liquid (solvent) to pass, retaining the dissolved substances (solute), must be able to withstand these high pressures. If the difference in pressure more than equalizes the osmotic gradient, the solvent molecules will pass through the membrane just as through a filter, while the "contaminating" molecules are retained. In contrast to a classic membrane filter, osmosis membranes do not possess continuous pores. Ions and molecules rather travel through the membrane by diffusing through the membrane material, as is described by the solution-diffusion model: The osmotic pressure increases with increasing difference in concentration. If the osmotic pressure becomes equal to the pressure applied, the process will stop. Then an osmotic equilibrium is present. A continuous discharge of the concentrate may prevent this. In the case of the concentrate outlet, the pressure is either controlled by a pressure regulator or used by a pressure exchanger in order to create the pressure required in the inlet of the system.

The first reverse osmosis step can be performed both under cold conditions and under hot conditions, i.e., at a temperature within the range of about 8 to 25° C., and preferably 10 to 12° C., or about 25 to 55° C., and more particularly 30 to 40° C. Temperatures of about 25° C. have proven to be particularly advantageous, as they allow a good balance between a sufficiently strong flow on the one hand, and a low microbial load and less clogging of the membrane on the other.

The membranes, which are preferably membranes made of synthetic material, have a mean pore size within the range of about 50 to about 500 Dalton, and more particularly about 100 to about 200 Dalton.

The process is directed at allowing that as little retentate as possible is formed, therefore, the first reverse osmosis step is preferably performed with a concentration factor within the range of about 10 to about 100, and more particularly about 40 to 60.

Under these process conditions, the lactate is quantitatively retained as retentate, while the permeate has already lost about half of its COD loading, i.e., its organic load, typically having COD values within the range of only about 250, starting from 500.

Separation of Urea (UR)

In order to separate urea, the first retentate such obtained is adjusted to an acid pH value, preferably within the range of about 2 to 3. To this end, particularly mineral acids such as hydrochloric acid or nitric acid are suitable. The acid retentate is cooled down to 2 to 10° C., preferably to about 3 to 5° C., either simultaneously or subsequently. This may be performed, for example, by cooling the reverse osmosis membrane accordingly, i.e., by means of process water from a heat-exchange step.

The membranes, which are preferably membranes made of a synthetic material, have a mean pore size within the range of about 50 to about 500 Dalton, and more particularly about 100 to about 200 Dalton, and are thus too big to retain smaller molecules such as urea. Surprisingly, it was found that the osmosis membranes, specifically those made of a synthetic material, contract under acid conditions and a simultaneous low temperature, thus enabling a quantitative separation of the urea.

As the process, as stated above, is directed at allowing the formation of as little retentate as possible, also the second reverse osmosis step is preferably performed at a concentration factor within the range of about 10 to about 100, and more particularly about 40 to 60.

These process conditions allow that also urea is quantitatively retained as retentate, obtaining a second permeate which has a COD value of below 50, i.e., typically of about 1 to about 10. In doing so, the two reverse osmosis steps can be performed in reverse order, separating the urea firstly, and then the lactic acid, without that this would have a negative effect on the final COD value achieved.

In addition, the process can be performed in batches or continuously. The process is explained schematically in the following FIG. 1 without being limited to it.

The waste water treated according to various embodiments disclosed herein practically has freshwater quality with COD values of typically 5, and, as such, it can be reused in processes of the dairy processing industry, for example, as diafiltration water in filtration steps, or as a supply to surface water.

EXAMPLES

Example 1

1,000 litres of vapour condensates from acid whey production having a COD value of about 500 and a lactic acid content of about 0.08% by weight and a urea content of about 1 mg/kg were placed in a stirred tank reactor and adjusted to a pH value of 11 using sodium hydroxide solution. The solution was stirred for about 10 minutes at a temperature of about 20° C., and was then placed on a first reverse osmosis membrane (material: polydimethylsiloxane) having a mean pore size of 100 Dalton; the concentration factor was 40. 25 litres of retentate, containing lactic acid, and 975 litres of permeate, having a COD value of only 250, were obtained.

In a second stirred tank reactor, the permeate was adjusted to pH 3 using hydrochloric acid and stirred for about 10 minutes at a temperature of about 20° C. The acid solution was then placed on a second reverse osmosis membrane (material: PES), which also had a mean pore size of 100 Dalton and which was cooled to 3° C. by means of process water from a heat-exchange step. 25 litres of urea-containing retentate and 950 litres of permeate, which only had a COD value of 5, were obtained.

Example 2

Vapour condensates from acid whey production having a COD value of about 500 according to example 1 were passed through a flow tube and mixed continuously, using a first rotor-stator mixer, with aqueous 50% by weight sodium hydroxide solution such that a pH value of 11 was obtained. The basic flow was placed on a first reverse osmosis membrane (material: polydimethylsiloxane) with a mean pore size of 100 Dalton; the concentration factor was 40. While retaining the retentate, the permeate was passed on and adjusted to a pH value of 3 using hydrochloric acid using a second rotor-stator mixer. The acid solution was continuously placed on a second reverse osmosis membrane (material: polydimethylsiloxane), which also had a mean pore size of 100 Dalton and which was cooled to 3° C. by means of process water from a heat-exchange step. While retaining the retentate again, a treated waste water was continuously removed as permeate which still had a COD value of 5.

Example 3

1,000 litres of vapour condensates from acid whey production having a COD value of about 500 were placed in a stirred tank reactor, adjusted to pH 3 using hydrochloric acid, and stirred at a temperature of about 20° C. for about 10 minutes. The acid solution was placed on a first reverse osmosis membrane (material: polydimethylsiloxane), which had a mean pore size of 100 Dalton and which had been cooled to 3° C. by means of process water from a heat-exchange step. 100 litres of urea-containing retentate and 900 litres of permeate were obtained, which still had a COD value of about 250.

The permeate was adjusted to a pH value of 11 using sodium hydroxide solution in a second stirred tank reactor. The solution was stirred at a temperature of about 20° C. for about 10 minutes, and was then placed on a second reverse osmosis membrane (material: PES), having a mean pore size of 100 Dalton; the concentration factor amounted to 40. 25 litres of retentate, containing lactic acid, and 875 litres of permeate were obtained, which still had a COD value of 5.

The invention claimed is:

1. A process for purification of waste water from dairy processing, comprising:
    providing a waste water from the dairy-processing industry, wherein the waste water comprises an organic load comprising lactic acid and urea;
    adjusting the waste water to an alkaline pH value, while precipitating the lactic acid as a lactate to obtain an alkaline waste water;
    subjecting the alkaline waste water to a first reverse osmosis step to obtain a first retentate and a first permeate, wherein the first retentate comprises lactate, and wherein the first permeate is substantially lactate-free;
    adjusting the first permeate to an acidic pH value to obtain an acidic first permeate;
    cooling the acidic first permeate to a temperature of from 2 to 10° C. to obtain a cooled first permeate;
    subjecting the cooled first permeate to a second reverse osmosis step to obtain a urea-containing second retentate and a second permeate that is substantially free from organic loading; and
    optionally recycling the second permeate by reintroducing the second permeate into a dairy-processing procedure.

2. The process of claim 1, wherein the waste water has a Chemical Oxygen Requirement (COD) value of about 500 or more.

3. The process of claim 1 wherein the lactic acid and the urea together make up at least 90% by weight of the organic load.

4. The process of claim 1 wherein the alkaline pH value to which the waste water is adjusted is from about 9 to about 11.

5. The process of claim 1 wherein the lactic acid is precipitated as sodium lactate, potassium lactate, or calcium lactate.

6. The process of claim 1 wherein the first reverse osmosis step is performed at a temperature of about 8 to about 55° C.

7. The process of claim 1 wherein the first reverse osmosis step is performed using a membrane which has a pore size of about 50 to about 500 Dalton.

8. The process of claim 1 wherein the first reverse osmosis step is performed at a concentration factor of about 10 to about 100.

9. The process of claim 1 wherein the acidic pH value to which the first permeate is adjusted is from about 2 to 3.

10. The process of claims 1 wherein the acidic first permeate is cooled to a temperature of about 3 to 5° C.

11. The process of claim 1 wherein the second reverse osmosis step is performed using a membrane which has a pore size within the range of about 50 to about 500 Dalton.

12. The process of claim 1 wherein the first reverse osmosis step is performed at a concentration factor of about 10 to about 100.

13. The process of claim 1 the urea-containing second retentate has a Chemical Oxygen Requirement (COD) value of less than 50.

14. The process of claim 1 the urea-containing second retentate has a Chemical Oxygen Requirement (COD) value of from about 1 to about 10.

15. A process for purification of waste water from dairy processing, comprising:
    providing a waste water from the dairy-processing industry, wherein the waste water comprises an organic load comprising lactic acid and urea;
    adjusting the waste water to an acidic pH value,
    subjecting the acid waste water to a first reverse osmosis step to obtain a urea-containing first retentate and a first permeate;
    adjusting the first permeate to an alkaline pH value;
    subjecting the first permeate to a second reverse osmosis step to obtain a lactic acid-containing second retentate and a second permeate that is substantially free from organic loading; and
    optionally recycling the second permeate by reintroducing the second permeate into a dairy-processing procedure.

* * * * *